United States Patent [19]

Anderson

[11] Patent Number: 5,680,257
[45] Date of Patent: Oct. 21, 1997

[54] LIGHT COLLECTION OPTICS FOR SPATIAL LIGHT MODULATOR

[75] Inventor: Charles H. Anderson, Dallas, Tex.

[73] Assignee: Texas Instruments Incorporated, Dallas, Tex.

[21] Appl. No.: 509,618

[22] Filed: Jul. 31, 1995

[51] Int. Cl.$^6$ .................. G02B 17/00; G02B 6/26
[52] U.S. Cl. .................. 359/727; 359/733; 385/43
[58] Field of Search .................. 385/43; 359/726, 359/728, 733, 727

[56] References Cited

U.S. PATENT DOCUMENTS

| | | | |
|---|---|---|---|
| 4,637,691 | 1/1987 | Uehara et al. | 359/709 |
| 4,757,431 | 7/1988 | Cross et al. | 362/261 |
| 4,883,333 | 11/1989 | Yanez | 385/33 |
| 5,098,184 | 3/1992 | van den Brandt et al. | 353/102 |
| 5,315,330 | 5/1994 | Hamada | 353/31 |
| 5,384,659 | 1/1995 | Shikama et al. | 359/719 |
| 5,418,583 | 5/1995 | Masumoto | 353/38 |
| 5,509,095 | 4/1996 | Baker et al. | 385/47 |

*Primary Examiner*—Georgia Y. Epps
*Assistant Examiner*—Jordan M. Schwartz
*Attorney, Agent, or Firm*—Julie L. Reed; James C. Kesterson; Richard L. Donaldson

[57] ABSTRACT

Various light collection systems (10, 20, 30), for providing light to be reflected from, or transmitted by, an SLM. Two systems (10, 20) include reflectors (11, 21), which are designed to collect rear-emitted light from a source, as well as lenses (12, 22) having low f-numbers and achromatic transmission, and may include an integrator (14, 23). A third system (30) includes a special reflector (31) coupled directly to an integrator (33).

8 Claims, 1 Drawing Sheet

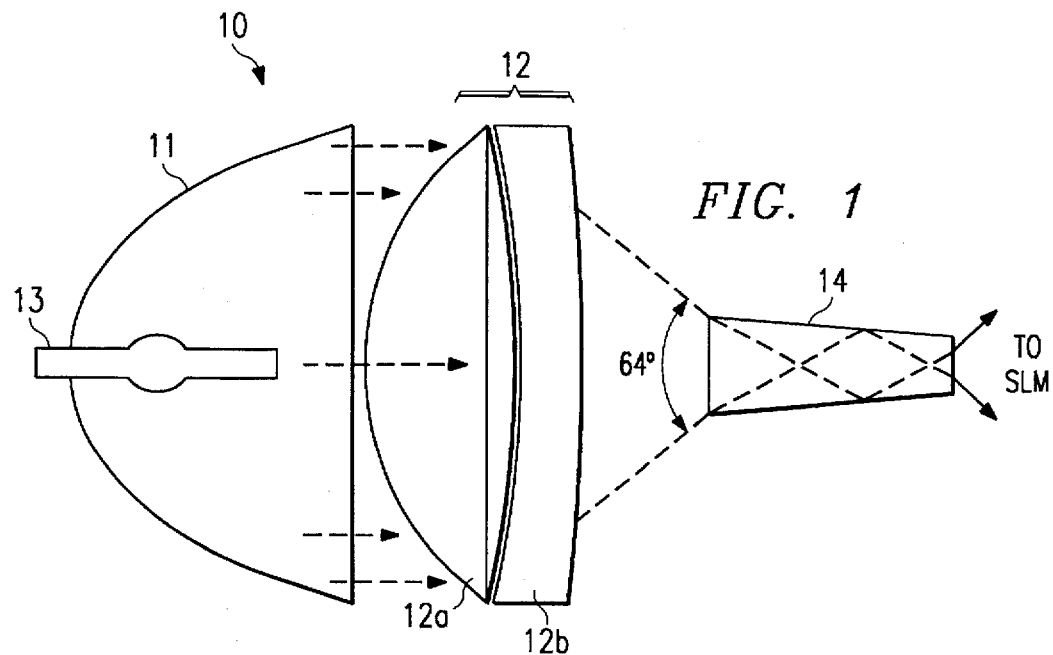
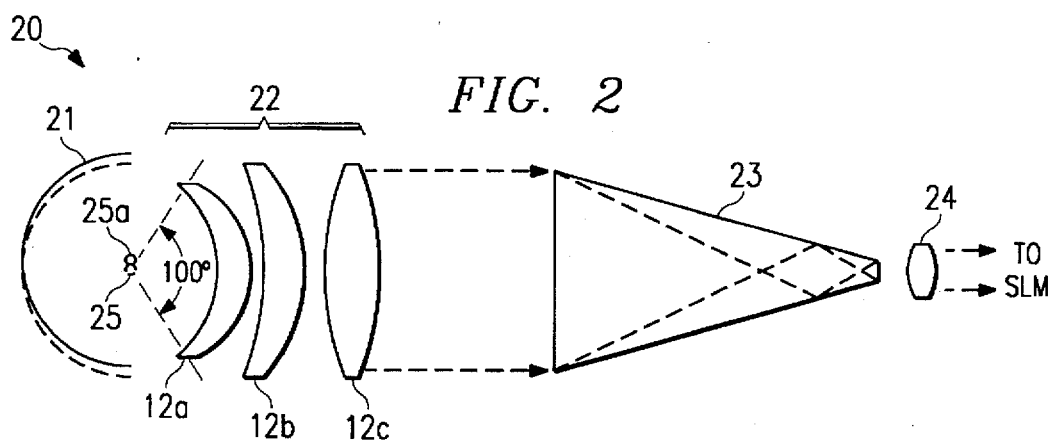
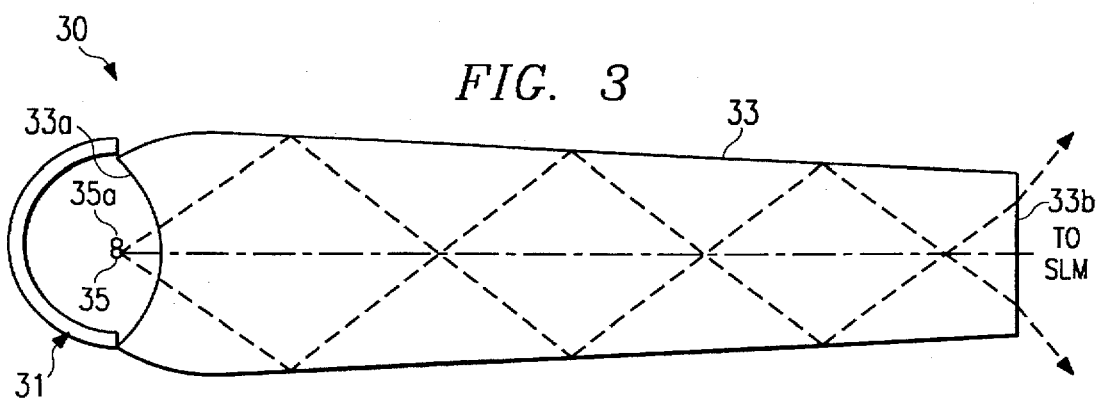

LIGHT COLLECTION OPTICS FOR SPATIAL LIGHT MODULATOR

TECHNICAL FIELD OF THE INVENTION

This invention relates to spatial light modulators, and more particularly to optical components for providing light to the spatial light modulator.

BACKGROUND OF THE INVENTION

Spatial light modulators (SLMs) are increasingly being used for providing images in both display systems and photoelectric printers. In general, SLMs are arrays of pixels that emit or reflect light to an image plane, such as a screen of a display system or a drum of a printer. The SLM modulates light by turning the pixel elements on or off.

Digital micro-mirror devices (DMDs) are one type of SLM. A DMD is an electromechanical device, whose pixel array is hundreds or thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. Incident light on the mirror array is reflected by the "on" mirrors in one direction and by the "off" mirrors in the other direction. The pattern of on versus off mirrors forms an image. In most applications, the light from the DMD is projected by a projection lens to the image plane.

An SLM may be reflective, such as the DMD, or transmissive. In either case, some sort of illumination system is required. Compactness and minimal heating are desirable characteristics for the illumination system. Typical sources include light emitting diodes and arc lamps, which should be as small, cool, inexpensive, and efficient as possible.

In addition to the light source, the illumination system has optical devices for collecting the light for delivery to the SLM. Such devices include reflectors and lenses for providing either collimated or focussed energy. Reflectors are placed behind the source, in contrast to lenses, which transmit light from the source. A common characteristic of existing light collection devices is that they tend to be inefficient in terms of collecting all available light from a given source.

SUMMARY OF THE INVENTION

The following invention is directed to various optical systems for collecting light from a source, such as an arc lamp, having spherical or hemispherical light emission. These light collection systems are especially designed for illuminating SLM's, which require homogeneous light having a well-defined beam size and shape. The light collection systems described herein include reflectors that collect "rear" radiation from the source, as well as lenses having high numerical apertures and that are achromatic so as to provide light with the required uniform chromaticity. Also, beam integrating optics may be used to receive the light from the lens and to "funnel" it to the SLM.

One particular aspect of the invention is a light collection system having a parabolic reflector for reflecting rear-emitted light from the source. A two-piece achromatic condenser receives light from the source, both directly and as reflected from the reflector. The condenser has an aspherical lens and a color-correcting lens, with the light being transmitted through the aspherical lens before passing through the color-correcting lens. The aspherical lens and the color-correcting lens are spaced a small distance apart with an air gap. The condenser has a low f-number, such as one in the range F/1.0 to F/0.5.

An advantage of the invention is that each of the light collection systems is designed to collect a high percentage of total radiation from a source that emits into spherical or hemispherical space. This permits the use of a source having less power, and therefore results in less expensive and cooler illumination systems for SLMs. The light meets the stringent uniformity requirements for SLMs by eliminating obscurations, such as those resulting from LED bond wires or supports or electrodes of arc lamps.

BRIEF DESCRIPTION OF THE DRAWINGS

FIG. 1 illustrates a first embodiment of a light collection system.

FIG. 2 illustrates a second embodiment of a light collection system.

FIG. 3 illustrates a third embodiment of a light collection system.

DETAILED DESCRIPTION OF THE INVENTION

The following description is directed to types of collection optics for a reflective spatial light modulator (SLM). Both are for projection systems, in that the SLM generates an image, which is projected by a projection lens to an image plane. For purposes of example, the SLM is a DMD, but other types of SLMs could be used. Regardless of the type of SLM, the light collection optic systems described herein are designed to receive maximum energy from a given light source and to provide well-defined and homogenous illumination for the SLM. Typically, the desired light is white, but, in general, for a given source with a given range of wavelengths, the output light is corrected to provide this same range.

The light collection optic systems described herein could be used in either a printing system or an image display system. In an image display system, the DMD is addressed with data representing pixel intensities. The on/off duration of each pixel element is controlled during each image frame in a form of pulse width modulation. Greyscale images are defined by which pixel are on or off and for how long during each frame. In a printing system, modulated light from the DMD is used to determine whether pixels of the page being printed are on or off, with the duration of exposure time being one method of controlling greyscale.

Examples of a DMD-based image display systems, without the light collection optics of the present invention, are described in U.S. Pat. No. 5,079,544, entitled "Standard independent Digitized Video System," in U.S. patent Ser. No. 08/147,249, entitled "Digital Television System," and in U.S. patent Ser. No. 08/146,385, entitled "DMD Display System," each assigned to Texas Instruments Incorporated, and each incorporated by referenced herein. An example of a DMD-based printing system is described in U.S. Pat. No. 5,041,851, entitled "Spatial Light Modulator Printer and Method of Operation", assigned to Texas Instruments incorporated and incorporated by reference herein.

The following light collection systems are especially designed for use with an arc lamp 13. A feature of arc lamp 13 is its nearly 4π steradian radiation, including both frontal and rear radiation. However, these systems would be useful for any source having spherical or hemispherical radiation, and more particularly, both frontal and rear radiation.

Each of these systems directs the collected light to the SLM, which reflects modulated light to the projection lens. The acceptance aperture of the projection lens provides the optical invariant for the light collection system. As discussed below, the reflectors, lens, and integrators that comprise the light collection systems adhere to this optical invariant in a manner that efficiently maximizes the amount of light collected.

FIG. 1 illustrates a light collection system 10, comprised essentially of a parabolic reflector 11 and a two-lens achromatic condenser 12. A light integrator 14 captures the rays from the condenser 12 and provides a homogeneous beam of illumination.

Reflector 11 is reflective on its concave inner surface. This permits it to reflect rear radiation from arc lamp 13. As a result, both reflected and directly emitted rays reach condenser 12. Reflector 11 is parabolic so that the exit rays are substantially collimated. The curvature and size of reflector 11 are consistent with the size of the beam accepted by condenser 12.

A feature of condenser 12 is that it is high speed, having a low f -number, such as one in the range of F/1.0 to F/0.5. As indicated in FIG. 1, a typical cone angle of light out of condenser 12 is 64 degrees. The two lenses that comprise condenser 12, lenses 12a and 12b, are matched to reflector 11 and integrator 14, with light entering the latter at an angle less than the critical angle. The achromatic feature of condenser 12 ensures the uniform chromaticity for DMD applications.

Lens 12a is an asphere, typically molded, such as molded pyrex. The aspherical shape is chosen so as to provide a well-defined focus for the rays exiting from condenser 12.

Lens 12b is a color-correcting lens, and accordingly, is made from a material having a higher index of refraction than lens 12a. Its shape and size are selected so as to produce a concentrated spot of light with maximum whiteness (for a white light source). An air space 12c is between the two lenses 12a and 12b, which may be spaced by means of a small shim or similar means. The spacing between lenses 12a and 12b reduces heat.

Light integrator 14 has an entrance size and shape appropriate for the beam of light from condenser 12 to internally reflect within integrator 14. It funnels the collected light to provide an exit beam that matches a desired shape and size. Integrator 14 may be conical or rectangular in its cross-sectional dimension, and is made from a refractive material. A taper in its cross-sectional dimension, with decreasing area from entrance to exit, maximizes its internal reflection. The length of integrator 14 varies depending on lamp and uniformity requirements, but is typically 100–200 millimeters. The light from integrator 14 is delivered to the SLM (object plane) via any one of a number of types of optical relay devices, such as a relay lens or a Koehler prism system.

FIG. 2 illustrates another light collection system 20, which is also especially useful for a source, such as arc lamp 25, having both front and rear radiation. The components of system 20 are an off-axis reflector 21, a three-lens collimator 22, integrator 23, and an aspheric relay lens 24. A feature of system 20 improved efficiency due to the off-axis reflector 21, and a wide collection angle into collimator 22.

As indicated by the dotted lines, reflector 21 is slightly offset from a position that would put source 25 at its center of curvature. As a result, source 25 is re-focussed within reflector 21 as image 25a. Reflector 21 is spherical so as to provide this re-focussing. This type of reflector 21 is referred to herein as an "off-axis" reflector 21.

Collimator 22 is a high speed lens, having a low f-number. It collects a wide cone angle from reflector 21. An example of a suitable collimator 22 is one having a low f-number, in a range of F/1.0 to F/0.5. As indicated in FIG. 2, a typical cone angle of the rays collected from reflector 21 is 100 degrees. The light exiting from lens 22 is substantially collimated. Typically, lens 22 requires at least three lenses 12a–12c so as to accept a wide cone angle and ensure chromacity correction. At least one lens has a different index of refraction than the others.

Integrator 23 is similar to integrator 14. Aspheric condenser lens 24 relays the light from integrator 23 to the SLM.

FIG. 3 illustrates a third type of light collection system. System 30 is essentially comprised of an off-axis reflector 31 coupled to an integrator 33. Reflector 31 is similar to reflector 21, in that it increases the energy from a given source 35 by providing a secondary image 35a, which it focuses to a predetermined point.

Integrator 33 has a concave face 33a for receiving a wide cone angle of light from reflector 31. As shown, the concave surfaces of reflector 31 and integrator 33 face each other and have abutting edges. The receiving face 33a is circular and thus integrator 33 is conical at its receiving end. The emitting face 33b of integrator 33 may also be conical, or may be rectangular such that integrator 33 changes shape from front to rear. The size of shape of the receiving face 33a is such that the cone of reflected light enters integrator 33 with its rays at an angle less than the critical angle.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical system operable to receive light from a source having spherical or hemispherical light emission, to provide illumination to an image projection system comprising;

an off-axis reflector for reflecting rear-emitted light from said source thereby providing a secondary image of said source, said reflector having a spherical reflective surface;

a multi-lens achromatic collimator for receiving light from said source, both directly and as reflected from said reflector, said collimator having at least three lenses that collectively provide color correction, and said collimator having an f-number in the range F/1.0 to F/0.5, and said collimator providing substantially collimated light; and a spatial light modulator (SLM) operable to receive light from said collimator, wherein said light has uniform chromaticity and transmitting said light to an image plane.

2. The optical system of claim 1, wherein said SLM delivers modulated light to a projection lens and wherein the optical geometry of said reflector and of said collimator are matched to said projection lens.

3. The optical system of claim 1, further comprising a light integrator for receiving light from said collimating lens.

4. The optical system of claim 3, wherein said light integrator has a shape that is tapered from entrance to exit.

5. The optical system of claim 3, wherein said SLM has an array of reflecting or transmitting pixels and wherein said integrator has a cross-sectional shape such that light exiting said integrator matches the shape of said array.

6. The optical system of claim 1, wherein said collimator receives a cone of radiation from said reflector having a cone angle of at least 90 degrees.

7. An optical system for collecting light from a source such as an arc lamp having spherical or hemispherical light emission, for providing illumination to an image projection system comprising:

an off-axis reflector for reflecting rear-emitted light from said source thereby providing a secondary image of said source, said reflector having a spherical reflective surface;

a light integrator for receiving light from said source, both directly and as reflected from said reflector, said light integrator having a concave face for receiving a wide cone angle of said light; and a spatial light modulator operable to receive light from said integrator, wherein said light exits said integrator shaped to match the shape of said spatial light modulator wherein said reflective surface of said reflector and said concave face of said integrator are coupled such that said integrator receives substantially all light form said reflector at an angle appropriate for internal reflection within said integrator.

8. The optical system of claim 7, wherein said light integrator has a shape that is tapered from entrance to exit.

* * * * *